(12) United States Patent
Yoshii et al.

(10) Patent No.: US 10,747,663 B2
(45) Date of Patent: Aug. 18, 2020

(54) STORAGE DEVICE, COMPUTER SYSTEM, AND OPERATION METHOD OF STORAGE DEVICE CONFIGURED TO ARBITRARILY STOP GARBAGE COLLECTION

(71) Applicant: Toshiba Memory Corporation, Minato-ku (JP)

(72) Inventors: Kenichiro Yoshii, Bunkyo (JP); Tetsuya Sunata, Yokohama (JP); Daisuke Iwai, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/126,021

(22) Filed: Sep. 10, 2018

(65) Prior Publication Data

US 2019/0303289 A1 Oct. 3, 2019

(30) Foreign Application Priority Data

Mar. 27, 2018 (JP) ................................. 2018-059835

(51) Int. Cl.
*G06F 12/00* (2006.01)
*G06F 12/02* (2006.01)

(52) U.S. Cl.
CPC .. *G06F 12/0253* (2013.01); *G06F 2212/1044* (2013.01); *G06F 2212/7205* (2013.01)

(58) Field of Classification Search
None
See application file for complete search history.

(56) References Cited

U.S. PATENT DOCUMENTS

2017/0177469 A1 6/2017 Hashimoto
2017/0270042 A1* 9/2017 Tseng ................. G06F 12/0253
2018/0307599 A1* 10/2018 Tamura .............. G06F 12/0253

FOREIGN PATENT DOCUMENTS

TW 201732832 A 9/2017

* cited by examiner

*Primary Examiner* — Reginald G Bragdon
*Assistant Examiner* — Michael L Westbrook
(74) *Attorney, Agent, or Firm* — Oblon, McClelland, Maier & Neustadt, L.L.P.

(57) ABSTRACT

According to one embodiment, a storage device includes a nonvolatile memory and a controller. The nonvolatile memory cannot overwrite data written in a memory area. The controller controls writing/reading of data to/from the nonvolatile memory in response to a request from a host device. The controller includes a garbage collection processor and a garbage collection controller. The garbage collection processor executes garbage collection to reuse a memory area on the nonvolatile memory in which unnecessary data remain. The garbage collection controller stops the garbage collection executed by the garbage collection processor when the storage device is in a loaded state equal to or less than a threshold value.

19 Claims, 7 Drawing Sheets

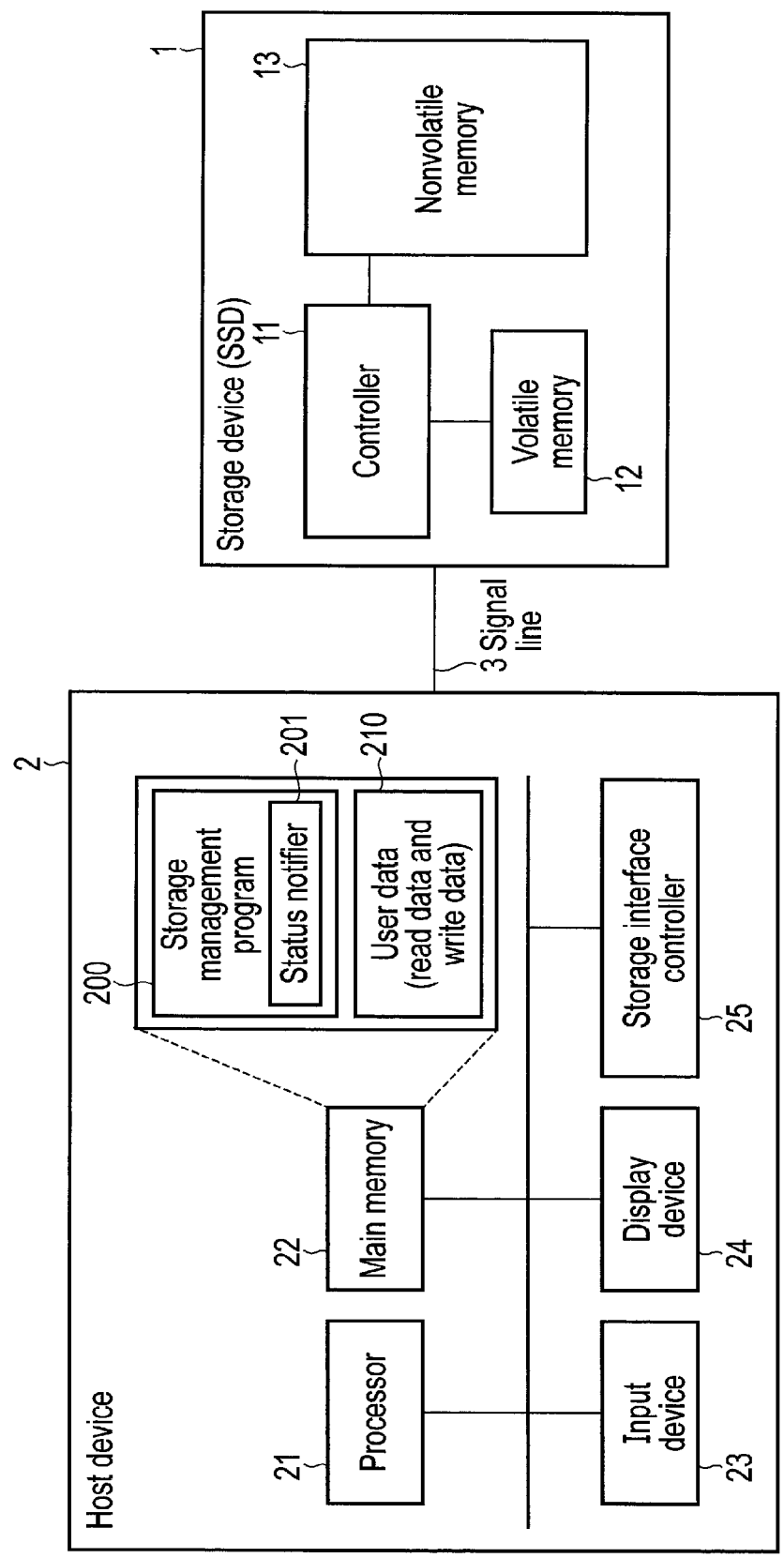
F I G. 1

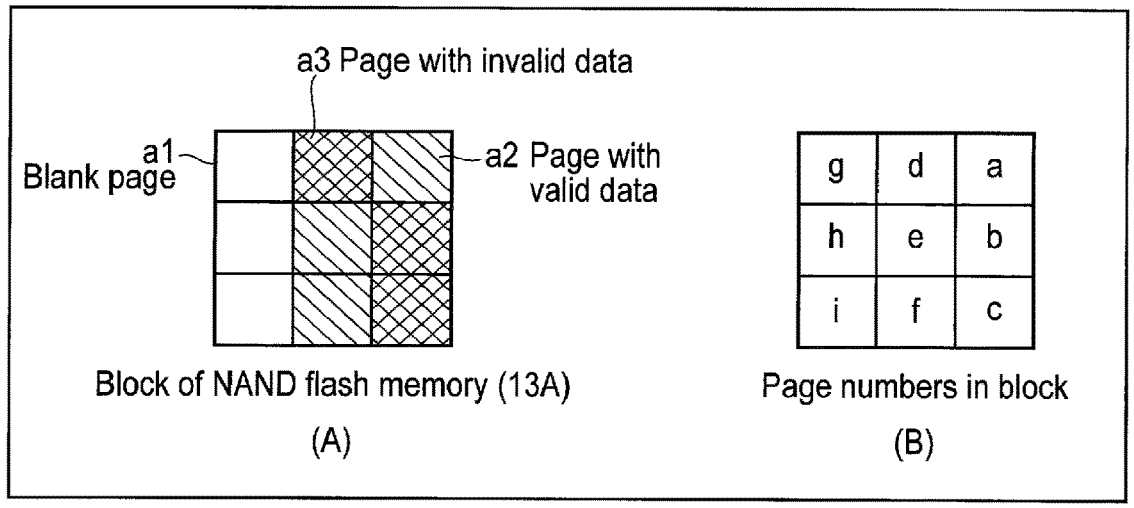
F I G. 3
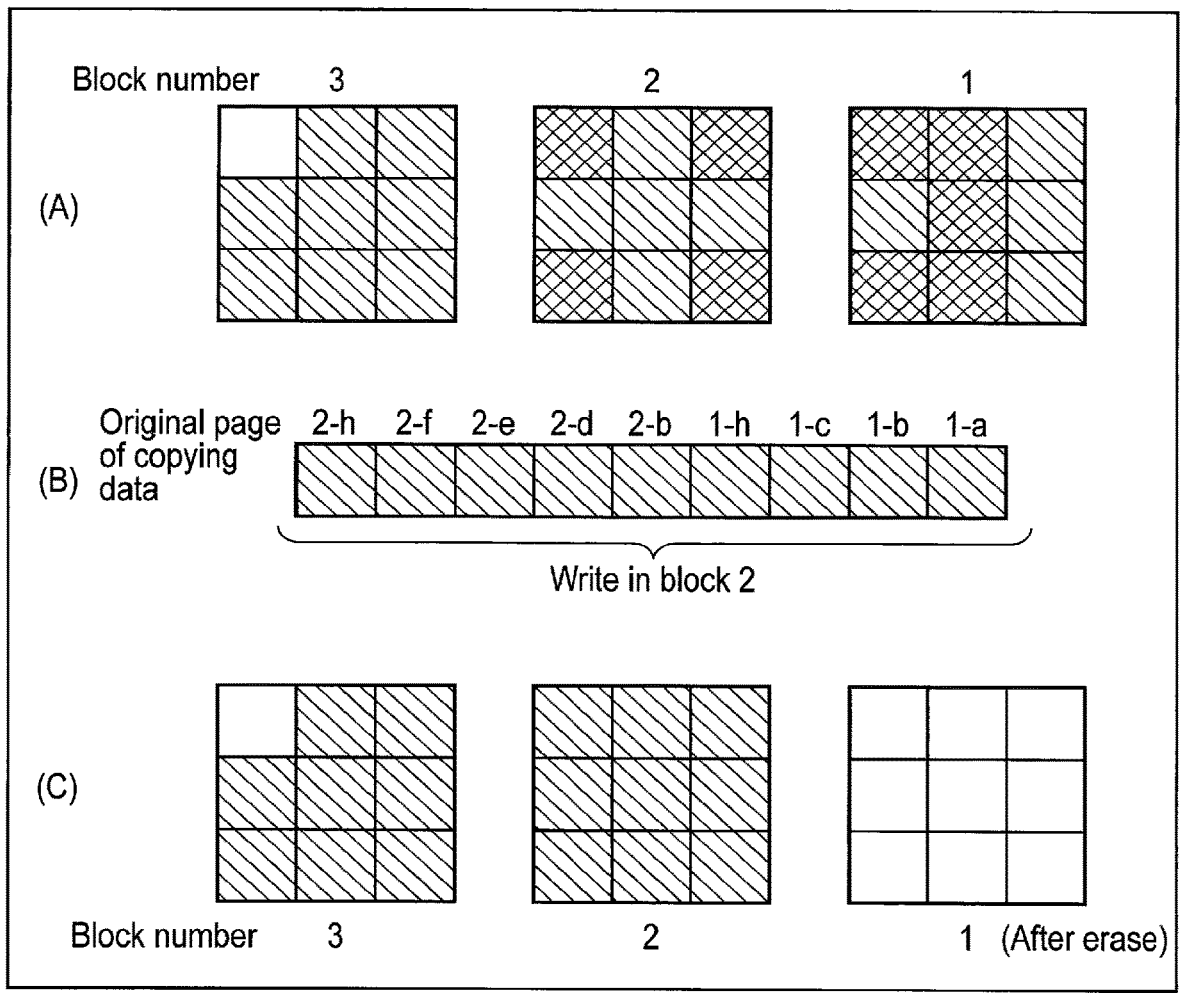
F I G. 4

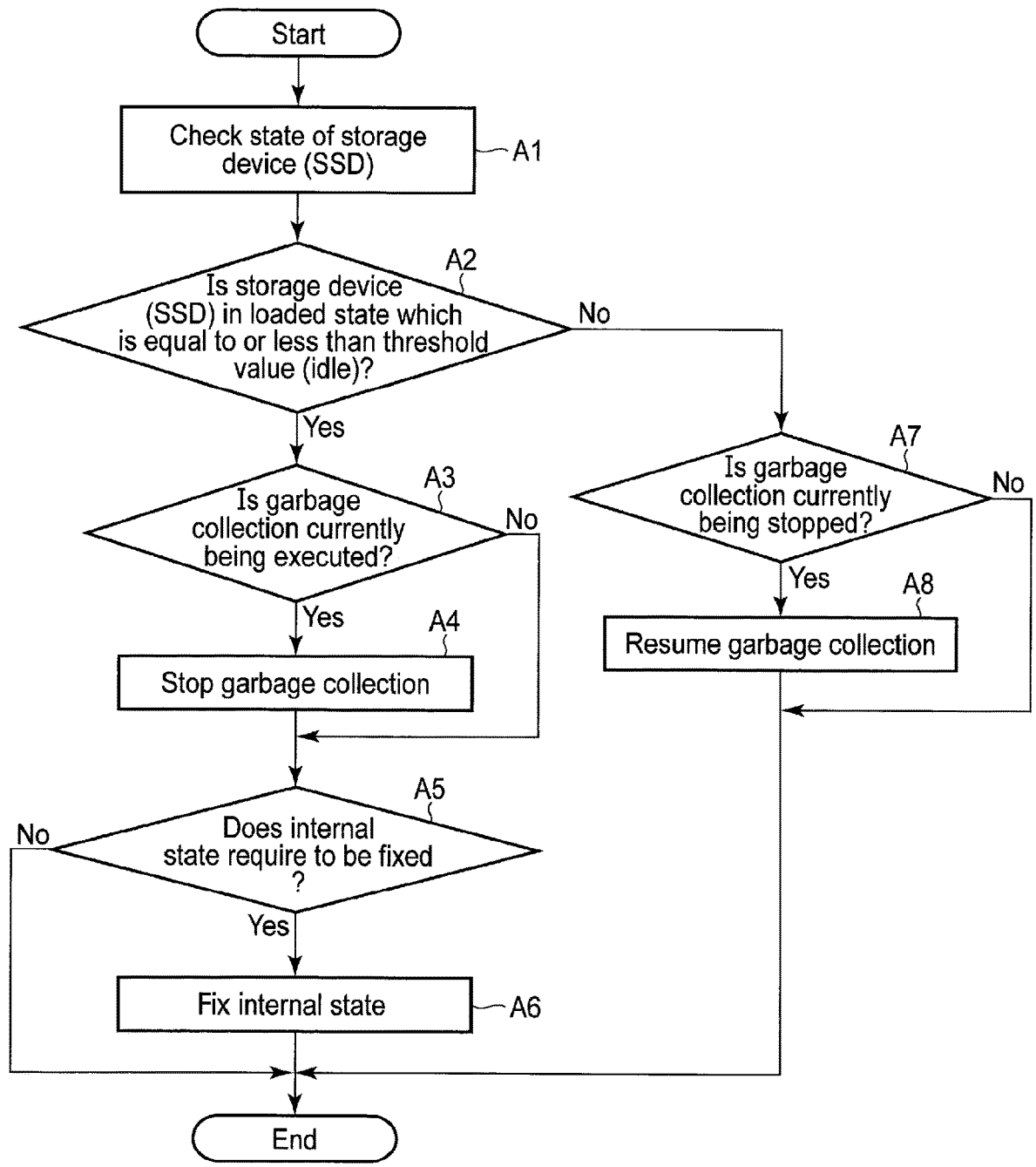
F I G. 5

| Bytes | Bits | | | | |
|---|---|---|---|---|---|
| | 31-16 | 15-14 | 13-10 | 9-8 | 7-0 |
| 63-60 | CDW15: command specific | | | | |
| 59-56 | CDW14: command specific | | | | |
| 55-52 | CDW13: command specific | | | | |
| 51-48 | CDW12: command specific | | | | |
| 47-40 | CDW11, CDW10: command specific | | | | |
| 39-32 | CDW9, CDW8: PRP2 (for larger than 4KiB) | | | | |
| 31-24 | CDW7, CDW6: PRP1 | | | | |
| 23-16 | CDW5, CDW4: MPTR (always zero) | | | | |
| 15-8 | CDW3, CDW2: Reserved | | | | |
| 7-4 | CDW1: NSID (Namespace ID) | | | | |
| 3-0 | CDW0: CID (Command ID) | 00b | [Reserved] | 00b | Opecode=C0h |

STORAGE DEVICE, COMPUTER SYSTEM, AND OPERATION METHOD OF STORAGE DEVICE CONFIGURED TO ARBITRARILY STOP GARBAGE COLLECTION

CROSS-REFERENCE TO RELATED APPLICATIONS

This application is based upon and claims the benefit of priority from Japanese Patent Application No. 2018-059835, filed Mar. 27, 2018, the entire contents of which are incorporated herein by reference.

FIELD

Embodiments described herein relate generally to a storage device, a computer system, and an operation method of a storage device.

BACKGROUND

In storage devices such as a solid state drive (SSD) using a NAND flash memory as their main nonvolatile memory medium, garbage collection (GC) is required to reuse a memory area on the NAND flash memory in which unnecessary data remain.

BRIEF DESCRIPTION OF THE DRAWINGS

FIG. 1 is a diagram showing an example of a computer system of a first embodiment.

FIG. 3 is a diagram showing an example of a structure and a state of blocks of a NAND flash memory.

FIG. 4 is a diagram for explaining a concept of garbage collection.

FIG. 5 is a flowchart showing a process of garbage collection of the storage device of the first embodiment.

DETAILED DESCRIPTION

Figure 2:
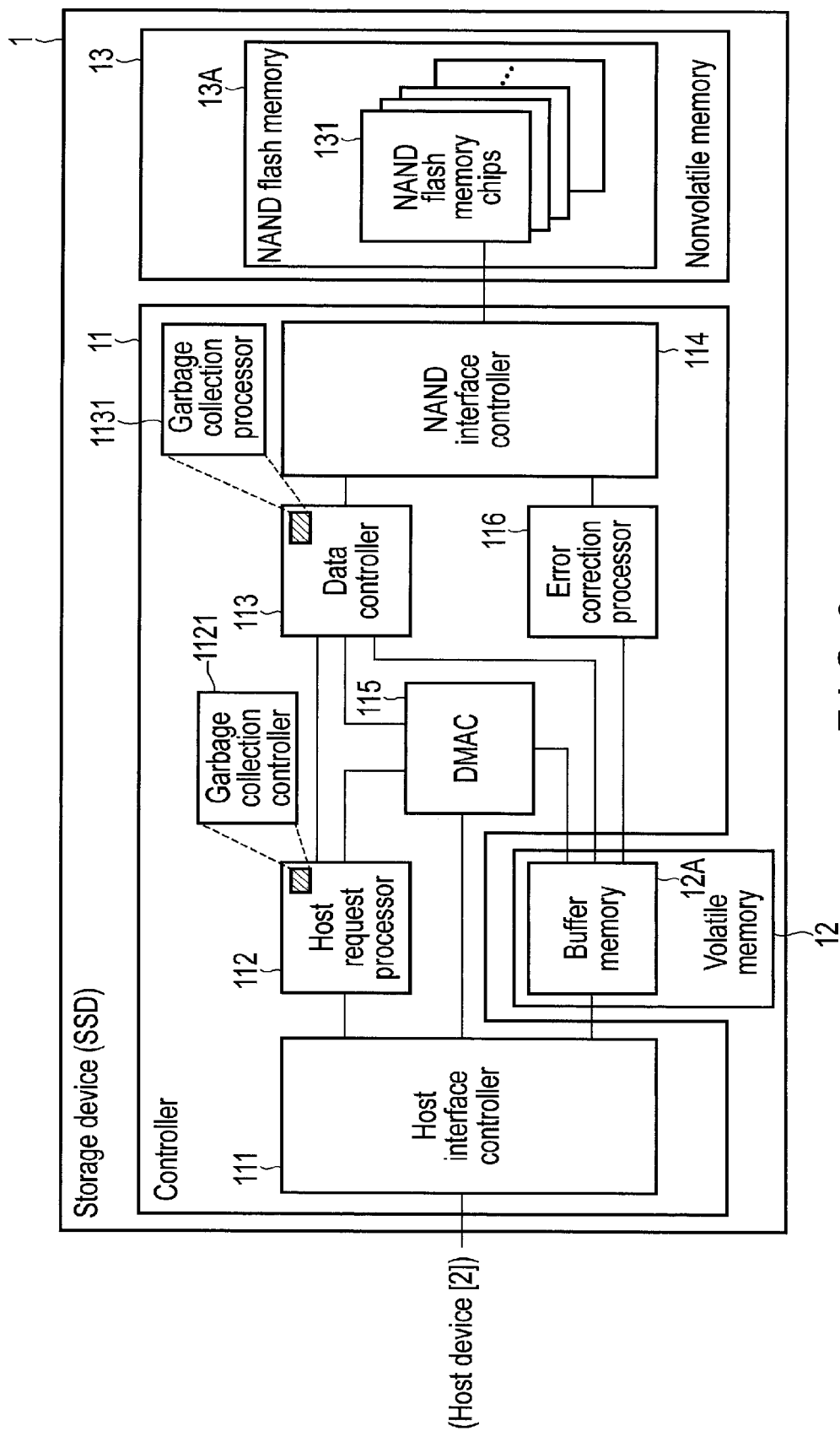
FIG. 2 is a diagram showing an example of the detailed structure of a storage device of the first embodiment.

In general, according to one embodiment, a storage device is connectable to a host device via an interface. The storage device includes a nonvolatile memory and a controller. The nonvolatile memory cannot overwrite data written in a memory area. The controller is configured to control writing/reading of data to/from the nonvolatile memory in response to a request from the host device, which is receivable from the host device in a case where the storage device is connected to the host device. The controller includes a garbage collection processor and a garbage collection controller. The garbage collection processor is configured to execute garbage collection to reuse a memory area on the nonvolatile memory in which unnecessary data remain. The garbage collection controller is configured to stop the garbage collection executed by the garbage collection processor when the storage device is in a loaded state equal to or less than a threshold value.

Hereinafter, embodiments will be explained with reference to accompanying drawings.

First Embodiment

A first embodiment will be explained.

FIG. 1 is a diagram showing an example of a computer system of the present embodiment. As shown in FIG. 1, the computer system includes a storage device 1 and a host device 2 which uses the storage device 1 as a main storage thereof, for example. The storage device 1 and the host device 2 are connected with a signal line 3. The storage device 1 may be accommodated in the casing of the host device 2, or may be externally connected to the host device 2. In this embodiment, it is assumed that the storage device 1 is realized as an SSD.

The storage device 1 includes a controller 11, volatile memory 12, and nonvolatile memory 13. Note that the volatile memory 12 may be disposed in the controller 11. That is, the volatile memory 12 may be omitted from the structure.

The controller 11 is a processing circuit configured to receive a command from the host device 2, and to write/read data to/from the nonvolatile memory 13 using the volatile memory 12 as a buffer. The controller 11 is a system on chip (SoC) including a central processing unit (CPU), for example. In a predetermined area of the nonvolatile memory 13, program to cause the storage device 1 to execute an intended operation is stored. The program is partly or entirely loaded into the volatile memory 12 when the storage device 1 is activated or reset, for example, and executed by the CPU in the controller 11.

The volatile memory 12 is a dynamic random access memory (DRAM), for example. Further, the nonvolatile memory 13 of the storage device 1 which may be realized as an SSD is a NAND flash memory. Note that, in this embodiment, it is assumed that the storage device 1 is realized as an SSD, however, no limitation is intended thereby, and the storage device 1 may be any devices including a memory (other than a NAND flash memory) which cannot overwrite data written in a memory area and requiring garbage collection.

On the other hand, the host device 2 is an information processor of a personal computer (PC) or a server, etc. The host device 2 includes a processor 21, a main memory 22, an input device 23, a display device 24, and a storage interface controller 25.

The processor 21 is a processing circuit configured to control components in the host device 2. The processor 21 loads various programs from the storage device 1 to the main memory 22 and executions them. In the various programs, a storage management program 200 with a status notifier 201 is included, which will be explained in the second embodiment. In the main memory 22, user data 210 used by the various programs are temporarily stored. In the user data 210, data to be written in the storage device 1 or data to be read from the storage device 1 is contained.

The input device 23 is a keyboard or a mouse, for example. The display device 24 is a display. One or both of the input device 23 and the display device 24 may be externally connected to the host device 2. Further, the input device 23 may be a communication device which communicates with an external device (including a keyboard or a mouse) in a wired or wireless manner.

The storage interface controller 25 is a device which executes communication with the storage device 1 via the signal line 3. Now, the connection and communication protocol between the storage device 1 and the host device 2 will be explained.

The host device 2 sends a request of data processing including reading/writing of data, request of state changing, or request of statistics data to the storage device 1 via the signal line 3. On the other hand, the storage device 1 sends replies to the request from the host device 2 including a result of data processing, result of state changing, or statistics data of the device to the host device 2 via the signal line 3. Various standards are adopted as methods of sending the requests and replies on the signal line 3 for mutual connection between various host devices 2 and the storage devices 1.

For example, as a standard to transmit/receive data between the host device 2 and the storage device 1 on the signal line 3, PCI express (PCIe) (registered trademark) is available. Further, for example, as a standard for procedures of sending request and reply as above, data format, or the like between the host device 2 and the storage device 1, non-volatile memory express (NVMe) (registered trademark) is available. Note that, in the computer system of the present embodiment, a predetermined standard is not given for a mechanism of transmitting/receiving data on the signal line 3, procedures of sending request and reply as above, and data format. The method of garbage collection explained herein can be applied to various standards including PCIe (registered trademark) and NVMe (registered trademark) and other standards.

Further, the host device 2 and the storage device 1 may not be connected via a physical signal line. The host device 2 and the storage device 1 may be connected by a method without a physical signal line, that is, by wireless local area network (LAN) or the like. That is, the method related to garbage collection explained herein is achievable even if the host device 2 and the storage device 1 are connected without a physical signal line.

FIG. 2 is a diagram showing an example of the detailed structure of the storage device 1.

As described above, the storage device 1 includes the controller 11, the volatile memory 12, and the nonvolatile memory 13. The controller 11 includes a host interface controller 111, a host request processor 112, a data controller 113, a NAND interface controller 114, a direct memory access controller (DMAC) 115, and an error correction processor 116, etc. Further, the storage device 1 includes a buffer memory 12A as the volatile memory 12 and a NAND flash memory 13A as the nonvolatile memory 13. As described above, the buffer memory 12A may be disposed in the controller 11. The NAND flash memory 13A includes a plurality of NAND flash memory chips 131 which can be parallelly operated. That is, logically, writing/reading of data to/from the NAND flash memory 13A can be executed in parallel by the number of the NAND flash memory chips 131 at maximum.

The host interface controller 111 receives a process request sent from the host device 2 to the storage device 1 via the signal line 3 and transfers the content of request to the host request processor 112. Further, in response to the request from the host request processor 112, the host interface controller 111 sends a reply of process result with respect to the process request from the host device 2 to the host device 2 via the signal line 3. Furthermore, according to an instruction from the DMAC 115, the host interface controller 111 reads target data of writing request from the host device 2 from the main memory 22 in the host device 2 side and writes the data to the buffer memory 12A, or the host interface controller 111 reads target data of reading request from the host device 2 from the buffer memory 12A and writes the data to the main memory 22 in the host device 2 side.

The host request processor 112 receives a process request sent from the host device 2 from the host interface controller 111, interprets the content of process request, and controls the storage device 1 according to the content of process request. For example, upon receipt of a data reading request from the host device 2, the host request processor 112 instructs the data controller 113 to read the requested data from the NAND flash memory 13A to the buffer memory 12A and transfers the data read in the buffer memory 12A to the main memory 22 in the host device 2 side by operating the DMAC 115. Further, for example, upon receipt of a data writing request from the host device 2, the host request processor 112 transfers write data from the main memory 22 in the host device 2 side to the buffer memory 12A by operating the DMAC 115 and instructs the data controller 113 to write the data in the buffer memory 12A to the NAND flash memory 13A. Upon completion of the process request received from the host device 2, the host request processor 112 transmits a process result to the host device 2. The reading/writing request from the host device 2 includes a type of requested process such as reading and writing and a size of data requesting the process.

Further, the host request processor 112 includes a garbage collection controller 1121. The garbage collection controller 1121 stops, if the garbage collection is executed under a predetermined condition by the storage device 1, the garbage collection currently being executed. Stopping of the garbage collection currently being executed by the garbage collection controller 1121 will be described later.

Note that, in some cases, the host request processor 112 and the host interface controller 111 may queue process requests (commands) notified from the host device 2. For example, in NVMe (registered trademark), a plurality of command queues and a maximum depth of each command queue are defined. The storage device 1 stores commands in the queue if the commands sent from the host device 2 cannot be processed immediately. In contrast, the host device 2 can send the commands to the storage device 1 as long as there is a space in the queue regardless of whether or not the storage device 1 can execute the commands at that time. Note that the command queue may exist in one of the host request processor 112 and the host interface controller 111, or may exist in the both.

Further, requests from the host device 2 to the storage device 1 include requests other than writing/reading of data. As described above, the storage device 1 may receive a request to change into power saving mode or a request of statistics data such as a total amount of write data and a total amount of read data. The request of statistics data may be defined by NVMe (registered trademark). Upon receipt of such requests, the host request processor 112 requests a corresponding process to the data controller 113 to perform an intended process.

The data controller 113 performs management of data stored in the storage device 1 and control of access to the NAND flash memory 13A. Specifically, the data controller 113 manages a pair of logical block address (LBA) which is designated when writing/reading is requested from the host device 2 and positional data in the NAND flash memory 13A in which latest data corresponding to the LBA are stored. The positional data in the NAND flash memory 13A will be referred to as NAND physical address (NPA). Further, a table of corresponding relationship between LBA and NPA managed by the data controller 113 will be referred to as logical-physical translation table.

Now, a data write process of the storage device 1 by which the logical-physical translation table is updated will be explained.

When a data write request is sent from the host device 2 to the storage device 1, the storage device 1 performs the following processes.

In the storage device 1 receiving a data write request from the host device 2, the host request processor 112 initially receives the write request via the host interface controller 111. The write request includes a head LBA of a destination LBA area, size of write, and a head address of the main memory 22 in the host device 2 side in which data to be written are stored.

Then, the host request processor 112 operates the DMAC 115 to transfer data of designated write size to the buffer memory 12A from the head address of the main memory 22 in the host device 2 side. The host request processor 112 instructs the data controller 113 to write the data in the buffer memory 12A to the NAND flash memory 13A.

Note that the host request processor 112 may send a reply to the write request received from the host device 2 to the host device 2 when the data requested to be written are all transferred to the buffer memory 12A, or when the data requested to be written are all written in the NAND flash memory 13A.

Upon receipt of the write request of data to the NAND flash memory 13A from the host request processor 112, the data controller 113 determines to which NPA in the NAND flash memory 13A the data are written, and if necessary, operates the error correction processor 116 to prepare encoded data from the data and operates the NAND interface controller 114 to write the encoded data to the NAND flash memory 13A.

The data controller 113 writes the encoded data to the NAND flash memory 13A, and then associates LBA of the data with NPA to which the encoded data generated from the data are written and record the associated LBA and NPA in the logical-physical translation table.

If a pair of the LEA and NPA in which old data corresponding to the LBA are recorded is stored in the logical-physical translation table, the data controller 113 updates the entry with new NPA. In this manner, the contents of logical-physical translation table are managed such that a corresponding relationship between LBA and NPA can be always latest.

Further, the data controller 113 includes a garbage collection processor 1131 configured to execute garbage collection depending on the state of the NAND flash memory 13A. Now, the process of garbage collection will be explained.

As described above, the storage device 1 writes data of write request received form the host device 2 into the NAND flash memory 13A. Further, the NAND flash memory 13A requires a data erase process per block unit to reuse the memory area in which data are already written.

That is, if the data write requests from the host device 2 are processed one after another, the storage device 1 will hold a large number of memory areas with invalid data which cannot be reused in the NAND flash memory 13A. If processing of the data write requests are kept, there will be no more area in which new data can be written eventually, and processing of data write requests becomes impossible. To avoid such a state, the garbage collection is executed.

The concept of garbage collection will be explained with reference to FIG. 3 and FIG. 4.

FIG. 3 is a diagram showing an example of a structure and a state of blocks of the NAND flash memory 13A. Here, the NAND flash memory 13A includes nine blocks (blocks a to i) for the simpler explanation. For example, pages without hatching (q, h, and i) denoted by symbol a1 are pages blank. On the other hand, hatched pages denoted by symbol a2 (a, e, and f) are pages in which valid data are recorded, and hatched pages denoted by symbol a3 (b, c, and d) are pages in which invalid data are recorded.

FIG. 4 is a diagram for explaining the concept of garbage collection (executed where the NAND flash memory 13A includes blocks as in FIG. 3 and the pages of the blocks are as in FIG. 3).

When blocks of the NAND flash memory 13A are as shown in FIG. 4(A), the storage device 1 writes data of new write request received from the host device 2 to page g of block 3. Further, since blocks 1 and 2 are filled with data in every page, no data can be written to blocks 1 and 2 as they are. Thus, a write request of data from the host device 2 cannot further be processed in this state.

Therefore, as shown in FIG. 4(B), the storage device 1 temporarily reads valid data from the NAND flash memory 13A from the data recorded in blocks 1 and 2, erases entire data in blocks 1 and 2, and writes back the valid data temporarily read into block 2. Note that, in FIG. 4(B), 1-*a* means page a of block 1, for example.

As a result, the state of blocks of NAND flash memory 13A becomes as shown in FIG. 4(C) where block 1 can be reused. The garbage collection can produce such blank blocks in such a manner.

Thus, the garbage collection includes a process of reading valid data from the NAND flash memory 13A and a process of writing back the valid data to the NAND flash memory 13A. Specifically, the garbage collection includes a process of determining data to be read from the NAND flash memory 13A and the above two processes. That is, during the garbage collection, the NAND flash memory 13A cannot perform a process on the basis of a request of write or a request of read from the host device 2.

Specifically, a signal line connecting the NAND interface controller 114 and the NAND flash memory 13A of FIG. 2 and the buffer memory 12A are used for garbage collection. Further, the data controller 113 performs a determination process to determine which data in the NAND flash memory 13A is selected to a copy target in garbage collection or the like. Furthermore, by executing garbage collection, the contents of the logical-physical translation table will be changed. This is because NPA in which the latest data corresponding to a certain LBA are recorded changes by data copying in garbage collection.

As can be understood from the above, garbage collection occupies the NAND flash memory 13A, uses resources in the storage device 1 such as buffer memory 12A and data controller 113, and changes the contents of the logical-physical translation table.

Because of the reasons mentioned above, garbage collection is conventionally executed in an idle time when the storage device 1 is not receiving a writing/reading request from the host device 2 such that a writing/reading request from the host device 2 is not interrupted. However, the garbage collection executed in an idle time changes the condition in the storage device 1 as mentioned above. This may consequently interrupt a writing/reading request of data from the host device 2.

For example, when a command is received from the host device 2 during writing/reading of data to/from the NAND flash memory 13A for garbage collection, the command cannot be processed until the writing/reading of data is completed. This means that the host device 2 must wait for a longer command processing time.

Further, a change in the contents of logical-physical translation table by garbage collection means that the contents of the changed logical-physical translation table must be fixed. This means that the storage device 1 must become unstable.

Furthermore, originally, garbage collection should be executed in response to a write request from the host device 2, and garbage collection executed in an idle time may be unnecessary. This may shorten the life of storage device 1.

As can be understood from the above, garbage collection executed by the storage device 1 in an idle time has many demerits.

On the other hand, there is a mechanism that the host device 2 determines whether or not garbage collection should be executed to the storage device 1.

However, as described above, garbage collection is a process the storage device 1 executes while referring to the internal condition thereof. Further, a time when the host device 2 instructs the execution of garbage collection is not necessarily an idle time for the storage device 1. For example, if the storage device 1 is configured to execute garbage collection in an idle time, garbage collection cannot be executed while the storage device 1 is processing a command from the host device 2 even if the execution of garbage collection is instructed from the host device 2 to the storage device 1.

Thus, as compared to a mechanism that the host device 2 instructs the execution of garbage collection to the storage device 1, it is more efficient that the storage device 1 itself selects a time to execute garbage collection.

In consideration of the above, in the present embodiment, the storage device 1 itself determines an idle time and does not execute garbage collection in an idle time.

The storage device 1 may be determined to be idle if the number of commands in a command queue of the host interface controller 111 or the host request processor 112 of the storage device 1 is equal to or less than a threshold value (first threshold value [first value]) (first conditions). The first threshold value may be the number of NAND flash memory chips 131 of the NAND flash memory 13A of the storage device 1. This is because at least one NAND flash memory chip 131 must be activated to process one host command, and thus, if the number of commands in a queue is less than the number of NAND flash memory chips 131, a group of commands may possibly be executed without causing much workload to the storage device 1.

Further, the storage device 1 may be determined to be idle if the number of commands currently being processed by the storage device 1 is equal to or less than a threshold value (second threshold value [second value]) (second condition). The second threshold value may be, as in the first threshold value, the number of NAND flash memory chips 131 of NAND flash memory 13A of storage device 1.

Furthermore, for example, the storage device 1 may be determined to be idle if the total data size of writing/reading of commands in a queue of the storage device 1 is equal to or less than a threshold value (third threshold value [third value]) (third condition). The third threshold value may be a size of buffer memory 12A of storage device 1. This is because exchange of writing/reading data between the storage device 1 and the host device 2 requires the buffer memory 12A, and thus, if the total size of data related to the commands in the queue is equal to or less than the size of buffer memory 12A, a group of commands may possibly be executed without causing much workload to the storage device 1. As mentioned above, a writing/reading request from the host device 2 includes a type of process required by writing/reading and a size of data requesting the process, and thus, the total data size of writing/reading of commands in the queue can be obtained.

That is, the storage device 1 of the present embodiment does not execute garbage collection if a loaded state thereof is equal to or less than a threshold value which defines that a requested performance is performable. Specifically, if garbage collection is executed in such a state, the process of garbage collection is stopped (suspended or terminated). That is, in this embodiment, the storage device 1 in an idle time does not mean a time when the storage device 1 is not receiving a writing/reading request of data from the host device 2 but means that the storage device 1 is in a loaded state which is equal to or less than a threshold value (by which the requested performance of the storage device 1 is defined). As aforementioned, garbage collection is executed by the garbage collection processor 1131 of the data controller 113. Then, the garbage collection controller 1121 of the host request processor 112 performs the above determination and the garbage collection processor 1131 of the data controller 113 arbitrarily stops the garbage collection currently being executed. Further, the garbage collection controller 1121 of the host request processor 112 memorizes stopping of garbage collection executed by the garbage collection processor 1131 of the data controller 113, and arbitrarily resumes the garbage collection currently being stopped. Specifically, the garbage collection controller 1121 of the host request processor 112 resumes garbage collection currently being stopped if the storage device 1 is no longer idle.

Note that the determination of the storage device 1 being idle may be performed on the basis of a plurality of threshold values (first, second, and third threshold values), that is, an optional combination of a plurality of conditions (first, second, and third conditions).

The storage device 1 checks the idleness on the basis of the above-defined criteria, and if the storage device 1 is determined to be idle, garbage collection is not executed thereafter. If the storage device 1 is determined to be idle during the execution of garbage collection, the process of garbage collection is stopped immediately. Here, some examples where the process is stopped immediately will be explained.

As explained with reference to FIG. 3 and FIG. 4, garbage collection includes: (A) a process to determine data to be read from the NAND flash memory 13A [first step]; (B) a process to read data from the NAND flash memory 13A [second step]; and (C) a process to write the read data to the NAND flash memory 13A [third step].

If a whole block is process unit as shown in FIG. 4, for example, process (A) requires a few milliseconds, process (B) requires twenty milliseconds, and process (C) requires one hundred milliseconds. On the other hand, a time required to read data requested by the host device 2 from the NAND flash memory 13A is a few tens microseconds. That is, a total time of processes (A) to (C) is very long, and stopping garbage collection after completing a process of a whole block is not considered immediate.

Thus, the storage device 1 of the present embodiment stops garbage collection at the time when a process currently being executed is completed. That is, if idleness is detected during process (A), garbage collection does not proceed to process (B), and if idleness is detected during process (B), garbage collection does not proceed to process (C).

Further, process (A) to (C) may be performed cyclically per page (first use unit) instead of block unit. That is, instead of reading data per block in process (B), reading data per page in process (B) and writing data per page in process (C) are performed repeatedly. Note that, in that case, valid data read from blocks 1 and 2 are not written back in one of blocks 1 and 2 (from which data are erased) as shown in FIG. 4 but are written back in a blank block other than blocks 1 and 2. If processes (A) to (C) are performed per page, for example, process (A) requires one millisecond, process (B) requires a few milliseconds, and process (C) requires a few milliseconds.

In that case, if idleness is detected, the storage device 1 of the present embodiment finishes process (C) of page currently being processed and stops garbage collection after the completion of the processes of the page. Thus, the garbage collection can be stopped earlier.

As a matter of course, a time to stop garbage collection because the storage device 1 is determined to be idle may be a time when the processes of block currently being processed is completed, and the storage device 1 of the present embodiment does not exclude such a case.

FIG. 5 is a flowchart showing a process of garbage collection of the storage device 1 of the present embodiment. Note that the storage device 1 may perform the process of FIG. 5 at each time when a command is received from the host device 2 or at each time when a command received from the host device 2 is completely processed. That is, the storage device 1 can perform the process of FIG. 5 arbitrarily.

Initially, the storage device 1 checks if the storage device 1 is idle using the above-mentioned criteria (step A1). If the storage device 1 is determined to be idle (step A2: Yes), the storage device 1 checks if garbage collection is currently executed (step A3). If garbage collection is currently executed (step A3: Yes), the storage device 1 immediately stops (suspends or terminates) garbage collection (step A4). Stopping of garbage collection may be executed using any one of the above-described examples.

If garbage collection is not currently executed (step A3: No) or stopping of garbage collection is completed, the storage device 1 checks if the internal state thereof is changed (step A5). In other words, the storage device 1 checks if the internal state needs to be fixed. The internal state includes the contents of logical-physical translation table as mentioned above.

If the internal state is not changed (step A5: No), the storage device 1 ends the process of FIG. 5. If the internal state is changed (step A5: Yes), the storage device 1 fixes the changed internal state (step A6) and ends the process of FIG. 5. Note that fixing means writing to the NAND flash memory 13A.

Further, if the storage device 1 is determined to be not idle (step A2: No), the storage device 1 then checks if garbage collection is stopped (step A7). If garbage collection is currently stopped (Yes in step A7), the storage device 1 resumes garbage collection (Step A8). If garbage collection is not currently stopped (step A7: No), the storage device 1 ends the process of FIG. 5.

Through the above process, the storage device 1 can achieve no garbage collection executed in an idle time. Since garbage collection is not executed during an idle time, a command processing time becomes shorter for the host device 2, an unstable state of the storage device 1 for a long period can be avoided, and unnecessary shortening of the storage device 1 can be prevented.

Second Embodiment

Next, the second embodiment will be explained. Note that the same structural elements as in the first embodiment will be referred to by the same reference numbers and explanation considered redundant will be omitted.

In the first embodiment, the storage deice 1 itself determines if the storage device 1 is idle and the storage device 1 does not execute garbage collection in its idle time in order to achieve various effects. On the other hand, as described above, various requests and notifications can be sent from the host device 2 to the storage device 1 other than writing/reading requests.

Thus, in a computer system of the present embodiment, the storage device 1 is configured to perform the process of FIG. 5 in the first embodiment depending on whether or not the host device 2 is idle (low loaded state [first condition]). Thus, the host device 2 includes the storage management program 200 with the status notifier 201. The storage management program 200 is a resident program to work with the storage device 1 and to manage the storage device 1 including to determine whether or not garbage collection is executed. The status notifier 201 performs a process to obtain a state of the host device 2 and a process to send notification indicative of the state of host device 2 to the storage device 1. If the storage device 1 performs the process of FIG. 5 to stop garbage collection while the host device 2 is in an idle time, the amount of process of the entire system is decreased, and power used for the system can be further decreased. Note that, in this example, in what condition the host device 2 becomes idle is disregarded.

Figures 6, 7:
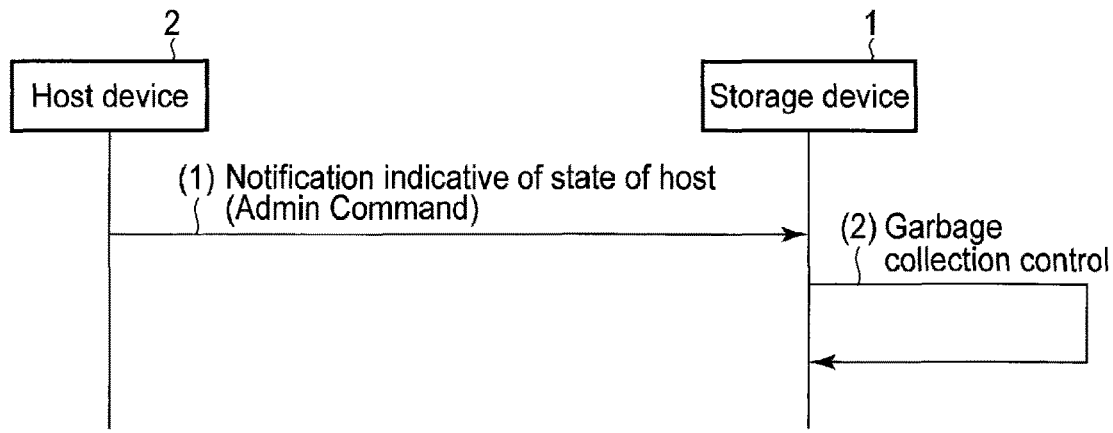
FIG. 6 is a sequence chart showing cooperation between a host device and a storage device of garbage collection in a computer system of a second embodiment.
FIG. 7 is a diagram showing a format of Admin Command defined by NVMe (registered trademark).

FIG. 6 is a sequence chart showing cooperation between the host device 2 and the storage device 1 of garbage collection of the computer system of the present embodiment.

Initially, the host device 2 sends a notification indicative of a state of host device 2, specifically, a notification indicative of whether or not the host device 2 is idle to the storage device 1 (FIG. 6: (1)). The notification may be an Admin Command defined by NVMe (registered trademark), for example. An example of use of the Admin Command for the notification indicative of the state of host device 2 will be explained with reference to FIG. 7.

FIG. 7 shows a format of Admin Command.

In NVMe (registered trademark), one command is sixty four bytes. Further, Opecode stored in a position denoted by symbol b1 is defined that "C0h" to "FFh" are vendor specific. Furthermore, if data transfer (other than sixty four byte command) is not included, bit [1:0] of Opecode is set to "00b". Thus, as Opecode of the command used for notification indicative of the state of host device 2, "C0h (11000000b)" will be assigned, for example (FIG. 7: b1). Then, if Opecode is "C0h", the following rules are given, for example. The host device 2 is determined to be idle if Command DWord (CDW) 2 denoted by symbol b2 is "0h", and the host device 2 is determined to be not idle if the CDW 2 is "1h". Thus, the notification indicative of the state of host device 2 can be sent from the host device 2 to the storage device 1.

The explanation will be continued referring to FIG. 6.

Upon receipt of the notification indicative of the state of host device 2 from the host device 2, the storage device 1 executes garbage collection control including stopping garbage collection currently being executed and resuming garbage collection currently being stopped on the basis of the notification (FIG. 6: (2)).

Figure 8:
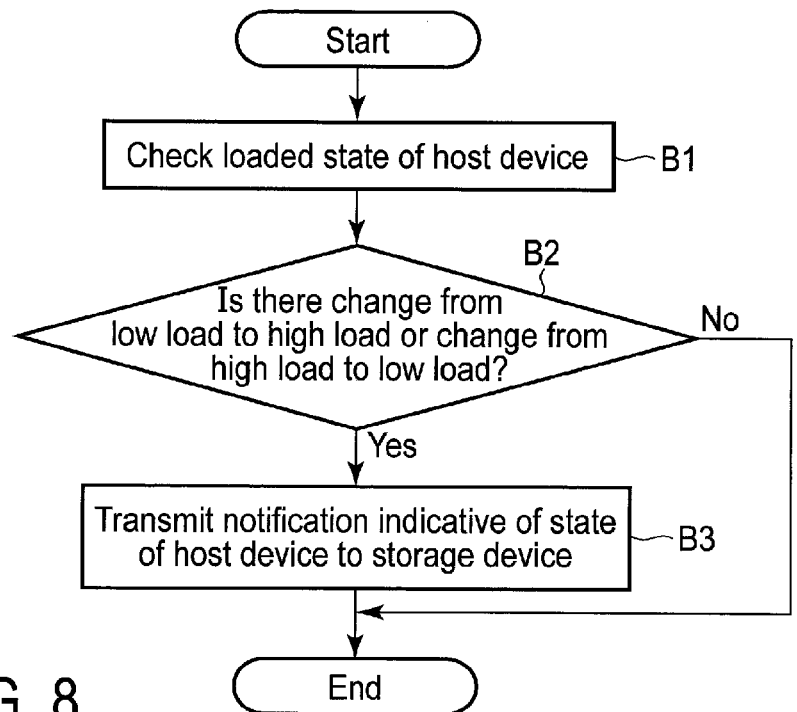
FIG. 8 is a flowchart showing the process of garbage collection of the host device of the second embodiment.

FIG. 8 is a flowchart showing the process of garbage collection of the host device 2 in the computer system of the present embodiment. Note that, in this embodiment, it is assumed that the host device 2 performs notification to the storage device 2 if the state of host device 2 is changed; however, no limitation is intended thereby. The notification to the storage device 1 may be performed at certain intervals.

The host device 2 initially checks a loaded state of host device 2 (step B1). Then, the host device 2 checks if a change from a low loaded state to a high loaded state or a change from a high loaded state to a low loaded state occurs (step B2).

If the state of host device 2 is changed (step B2: Yes), the host device 2 sends a notification indicative of the state of host device 2 to the storage device 1 (step B3) and ends the process of FIG. 8. If the state of host device 2 is not changed (step B2: No), the host device 2 ends the process of FIG. 8.

Figure 9:
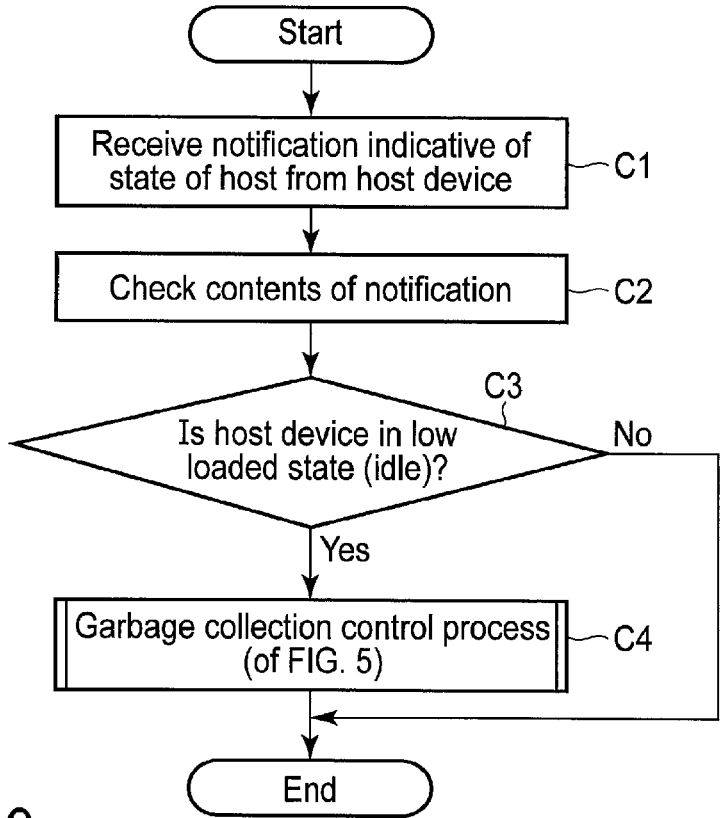
FIG. 9 is a flowchart showing the process of garbage collection of the storage device of the second embodiment.

FIG. 9 is a flowchart showing the process of garbage collection of the host device 2 of the computer system of the present embodiment.

Initially, the storage device 1 receives the notification indicative of the state of host device 2 sent from the host device 2 (step C1). The storage device 1 checks the contents of the received notification (step C2).

If the received notification indicates that the host device 2 is in an idle time (step C3: Yes), the storage device 1 performs the process of FIG. 5 of the first embodiment (step C4). If the received notification indicates that the host device 2 is not in an idle time (step C3: No), the storage device 1 does not perform the process of FIG. 5.

Through the above process, in the computer system of the present embodiment, optimization of the system where not only the storage device 1 but also the host device 2 are considered can be achieved.

Third Embodiment

Next, the third embodiment will be explained. Note that the same structural elements as in the first and second embodiments will be referred to by the same reference numbers and explanation considered redundant will be omitted.

In the second embodiment, the storage device 1 performs the process of FIG. 5 of the first embodiment when the host device 2 is in an idle time. However, the storage device 1 may be in an idle time while the host device 2 is not in an idle time. For example, if the host device 2 performs a bulk amount of calculation, access to the storage device 1 will be limited but the host device 2 is not idle.

Thus, in the computer system of the present embodiment, the storage device 1 performs the process of FIG. 5 when receiving a notification indicative of no idleness of host device 2.

Figure 10:
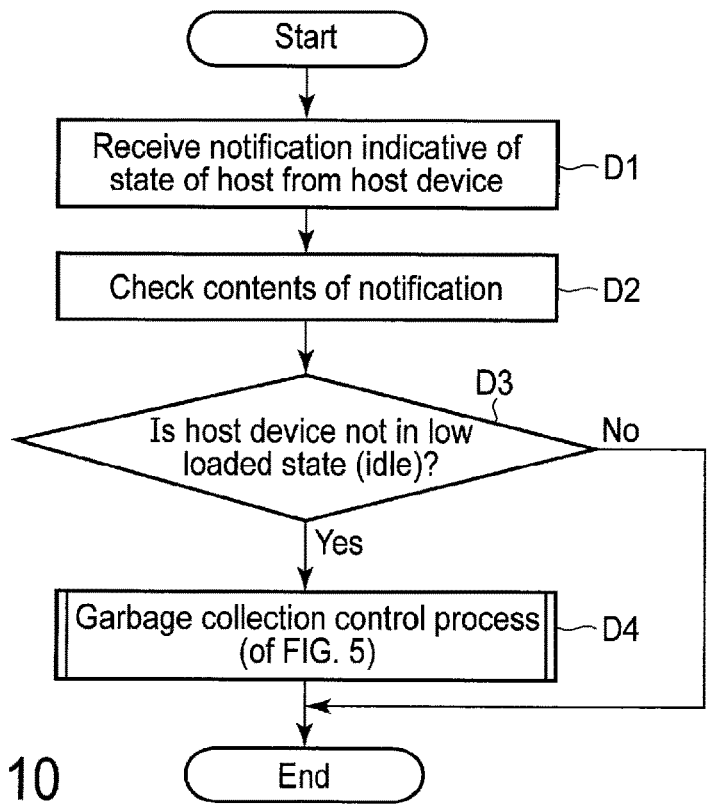
FIG. 10 is a flowchart showing the process of garbage collection of a storage device of a third embodiment.

FIG. 10 is a flowchart showing the process of garbage collection of the host device of the computer system of the present embodiment.

Initially, the storage device 1 receives the notification indicative of the state of host device 2 sent from the host device 2 (step D1). The storage device 1 checks the contents of the received notification (step D2).

If the received notification indicates that the host device 2 is not in an idle time (step D3: Yes), the storage device 1 performs the process of FIG. 5 of the first embodiment (step D4). If the received notification indicates that the host device 2 is in an idle time (No in step D3), the storage device 1 does not perform the process of FIG. 5.

Thus, in the computer system of the present embodiment, the storage device 1 grasps the state of host device 2 and determines execution of garbage collection on the basis of its internal state, and thus, a more flexible system can be achieved.

Fourth Embodiment

Next, the fourth embodiment will be explained. Note that the same structural elements as in the first to third embodiments will be referred to by the same reference numbers and explanation considered redundant will be omitted.

In the second and third embodiments, whether or not the storage device 1 performs stopping of garbage collection (FIG. 5) is determined on the basis of the idleness of host device 2. Note that, an amount of idle time of host device 2 depends on the characteristics of the system. For example, a PC is used by a single user and the system thereof often becomes idle. On the other hand, a server or a scientific purpose computing system is used by a large number of users at the same time and often operates busily. Further, whether or not the amount of idle time of host device 2 is long can be calculated from a history of notifications indicative of idleness of host device 2 sent from the host device 2. Specifically, a ratio of idle time of host device 2 in a certain period of time is calculated, and if the calculated value exceeds a reference value, the idle time is determined to be long.

Thus, in the computer system of the present embodiment, the storage device 1 is switched to perform the process of FIG. 9 when the host device 2 has much idle time and to perform the process of FIG. 10 when the host device 2 has less idle time.

Figure 11:
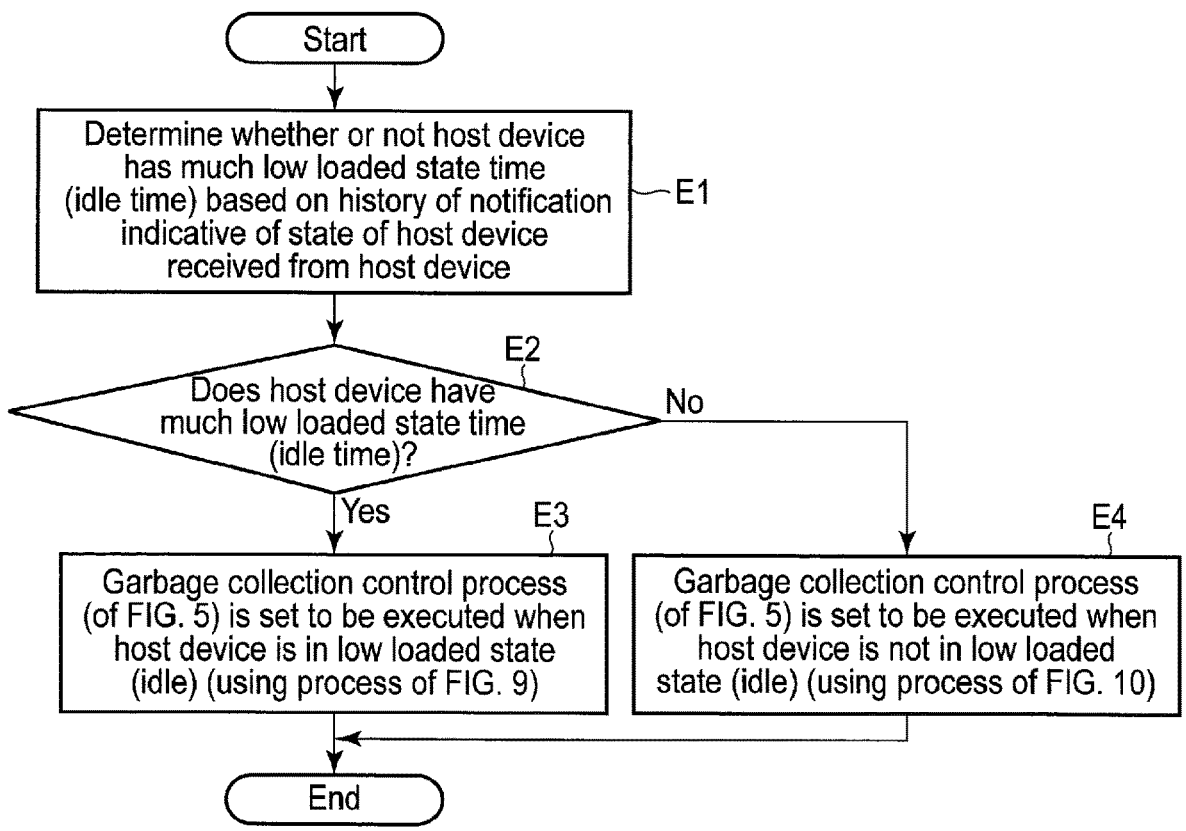
FIG. 11 is a flowchart showing the process of garbage collection of a storage device of a computer system of a fourth embodiment.

FIG. 11 is a flowchart showing the process of garbage collection of the storage device 1 of the computer system of the present embodiment.

The storage device 1 determines whether or not the host device 2 has much idle time on the basis of a history of notifications indicative of the state of host device 2 sent from the host device 2 (step E1). If the host device 2 is determined to have much idle time (step E2: Yes), the storage device 1 is set to perform the process of FIG. 5 while the host device 2 is in an idle time, that is, the storage device 1 is set to perform the process of FIG. 9 (step E3). On the other hand, if the host device 2 is determined to have less idle time (step E2: No), the storage device 1 is set to perform the process of FIG. 5 while the host device 2 is not in an idle time, that is, the storage device 1 is set to perform the process of FIG. 10 (step E4).

Note that, as opposite to the steps of FIG. 11, the process of FIG. 10 may be applied when the host device 2 has much idle time and the process of FIG. 9 may be applied when the host device 2 has less idle time.

Selection of the above settings may be determined by checking conditions of storage device 1, that is, by checking if the number of blank blocks is sufficient, or if the life of storage device 1 soon ends, or the like.

As can be understood from the above, in the computer systems of the first to fourth embodiments, the storage device 1 does not execute garbage collection in an idle time. Thus, a command processing time becomes shorter for the host device 2, an unstable state of the storage device 1 for a long period can be avoided, and unnecessary shortening of the storage device 1 can be prevented. That is, garbage collection executed unsuitably can be arbitrarily stopped.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device connectable to a host device via an interface, the storage device comprising:
    a nonvolatile memory that cannot overwrite data written in a memory area; and
    a controller configured to control writing/reading of data to/from the nonvolatile memory in response to a request from the host device, which is receivable from the host device in a case where the storage device is connected to the host device, wherein
    the controller comprises:
    a garbage collection processor configured to execute garbage collection to reuse a memory area on the nonvolatile memory in which unnecessary data remain; and
    a garbage collection controller configured to stop the garbage collection executed by the garbage collection processor when a number of commands queued in the storage device is equal to or less than a number of memory chips in the nonvolatile memory, which are parallelly operable, the commands being issued by the host device and being receivable from the host device in the case where the storage device is connected to the host device.

2. The storage device of claim 1, wherein:
    the garbage collection includes a first step, a second step and a third step, the first step being a step in which data to be read from a target memory area are determined, the second step being a step in which the data determined are read, the third step being a step in which the read data are written back; and
    the garbage collection controller is configured to stop the garbage collection when the garbage collection processor completes one of the first step, the second step and the third step, which is being executed.

3. The storage device of claim 1, wherein:
    the garbage collection includes a first step, a second step and a third step, the first step being a step in which data to be read from a target memory area are determined, the second step being a step in which the data determined are read, the third step being a step in which the read data are written back;
    the garbage collection processor is configured to cyclically execute the first step, the second step, and the third step by a first use unit of the nonvolatile memory; and
    the garbage collection controller is configured to stop the garbage collection when the garbage collection processor completes the first step, the second step, and the third step for any one of the first use unit.

4. The storage device of claim 1, wherein the garbage collection controller is configured to perform the determination of whether or not the number of commands queued in the storage device is equal to or less than the number of memory chips in the nonvolatile memory in order to determine whether or not the aarbaae collection being executed by the garbage collection processor is stopped, when notification indicative of a state of the host device indicates that the host device is in a first state, the notification being receivable from the host device in the case where the storage device is connected to the host device.

5. The storage device of claim 1, wherein the garbage collection controller is configured to perform the determination of whether or not the number of commands queued in the storage device is equal to or less than the number of memory chips in the nonvolatile memory in order to determine whether or not the garbage collection being executed by the garbage collection processor is stopped, when notification indicative of a state of the host device indicates that the host device is not in a first state, the notification being receivable from the host device in the case where the storaae device is connected to the host device.

6. The storage device of claim 1, wherein the garbage collection controller is configured to:
    calculate a ratio of idle time of the host device based on a history of notifications indicative of the idle time of the host device, the notification being receivable from the host device in the case where the storage device is connected to the host device;
    perform the determination of whether or not the threshold value the number of commands queued in the storage device is equal to or less than the number of memory chips in the nonvolatile memory in order to determine whether or not the garbage collection being executed by the garbage collection processor is stopped, when the notification indicating that the host device is in the first state is received from the host device in a case where the calculated ratio excesses a reference value; and
    perform the determination of whether or not the number of commands queued in the storage device is equal to or less than the number of memory chips in the nonvolatile memory in order to determine whether or not the garbage collection being executed by the garbage collection processor is stopped, when the notification indicating that the host device is not in the first state is received from the host device in a case where the calculated ratio is equal to or less than the reference value.

7. A storage device, connectable to a host device via an interface, the storage device comprising:
    a nonvolatile memory that cannot overwrite data written in a memory area; and
    a controller configured to control writing/reading of data to/from the nonvolatile memory in response to a request from the host device, which is receivable from the host device in a case where the storage device is connected to the host device, wherein
    the controller comprises:
    a garbage collection processor configured to execute garbage collection to reuse a memory area on the nonvolatile memory in which unnecessary data remain; and
    a garbage collection controller configured to stop the garbage collection executed by the garbage collection processor when a number of commands being processed by the storage device is equal to or less than a number of memory chips in the nonvolatile memory, which are parallelly operable, the commands being issued by the host device and being receivable from the host device in the case where the storage device is connected to the host device.

8. The storage device of claim 7, wherein:
the garbage collection includes a first step, a second step and a third step, the first step being a step in which data to be read from a target memory area are determined, the second step being a step in which the data determined are read, the third step being a step in which the read data are written back; and
the garbage collection controller is configured to stop the garbage collection when the garbage collection processor completes one of the first step, the second step and the third step, which is being executed.

9. The storage device of claim 7, wherein:
the garbage collection includes a first step, a second step and a third step, the first step being a step in which data to be read from a target memory area are deteii lined, the second step being a step in which the data determined are read, the third step being a step in which the read data are written back;
the garbage collection processor is configured to cyclically execute the first step, the second step, and the third step by a first use unit of the nonvolatile memory; and
the garbage collection controller is configured to stop the garbage collection when the garbage collection processor completes the first step, the second step, and the third step for any one of the first use unit.

10. The storage device of claim 7, wherein the garbage collection controller is configured to perform the determination of whether or not the number of commands being processed by the storage device is equal to or less than the number of memory chips in the nonvolatile memory in order to determine whether or not the garbage collection being executed by the garbage collection processor is stopped, when notification indicative of a state of the host device indicates that the host device is in a first state, the notification being receivable from the host device in the case where the storage device is connected to the host device.

11. The storage device of claim 7, wherein the garbage collection controller is configured to perform the determination of whether or not the number of commands being processed by the storage device is equal to or less than the number of memory chips in the nonvolatile memory in order to determine whether or not the garbage collection being executed by the garbage collection processor is stopped, when notification indicative of a state of the host device indicates that the host device is not in a first state, the notification being receivable from the host device in the case where the storage device is connected to the host device.

12. The storage device of claim 7, wherein the garbage collection controller is configured to:
calculate a ratio of idle time of the host device based on a history of notifications indicative of the idle time of the host device, the notifications being receivable from the host device in the case where the storage device is connected to the host device;
perform the determination of whether or not the number of commands being processed by the storage device is equal to or less than the number of memory chips in the nonvolatile memory in order to determine whether or not the garbage collection being executed by the garbage collection processor is stopped, when the notification indicating that the host device is in the first state is received from the host device in a case where the calculated ratio exceeds a reference value; and
perform the determination of whether or not the number of commands being processed by the storage device is equal to or less than the number of memory chips in the nonvolatile memory in order to determine whether or not the garbage collection being executed by the garbage collection processor is stopped, when the notification indicating that the host device is not in the first state is received from the host device in a case where the calculated ratio is equal to or less than the reference value.

13. A storage device, connectable to a host device via an interface, the storage device comprising:
a nonvolatile memory that cannot overwrite data written in a memory area; and
a controller configured to control writing/reading of data to/from the nonvolatile memory in response to a request from the host device, which is receivable from the host device in a case where the storage device is connected to the host device, wherein
the controller comprises:
a garbage collection processor configured to execute garbage collection to reuse a memory area on the nonvolatile memory in which unnecessary data remain; and
a garbage collection controller configured to stop the garbage collection executed by the garbage collection processor when a total data size of writinglreading of data by commands queued in the storage device is equal to or less than a first value, the commands being issued by the host device and being receivable from the host device in the case where the storage device is connected to the host device.

14. The storage device of claim 13, wherein the first value comprises a size of a buffer memory in which data written/read to/from the nonvolatile memory are temporarily stored.

15. The storage device of claim 13, wherein:
the garbage collection includes a first step, a second step and a third step, the first step being a step in which data to be read from a target memory area are determined, the second step being a step in which the data determined are read, the third step being a step in which the read data are written back; and
the garbage collection controller is configured to stop the garbage collection when the garbage collection processor completes one of the first step, the second step and the third step, which is being executed.

16. The storage device of claim 13, wherein:
the garbage collection includes a first step, a second step and a third step, the first step being a step in which data to be read from a target memory area are determined, the second step being a step in which the data determined are read, the third step being a step in which the read data are written back;
the garbage collection processor is configured to cyclically execute the first step, the second step, and the third step by a first use unit of the nonvolatile memory; and
the garbage collection controller is configured to stop the garbage collection when the garbage collection processor completes the first step, the second step, and the third step for any one of the first use unit.

17. The storage device of claim 13, wherein the garbage collection controller is configured to perform the determination of whether or not the total data size of writing/reading of data by commands queued in the storage device is equal to or less than the first value in order to determine whether or not the garbage collection being executed by the garbage collection processor is stopped, when notification indicative of a state of the host device indicates that the host device is in a first state, the notification being receivable from the host device in the case where the storage device is connected to the host device.

18. The storage device of claim 13, wherein the garbage collection controller is configured to perform the determination of whether or not the total data size of writing/reading of data by commands queued in the storage device is equal to or less than the first value in order to determine whether or not the garbage collection being executed by the garbage collection processor is stopped, when notification indicative of a state of the host device indicates that the host device is not in a first state, the notification being receivable from the host device in the case where the storage device is connected to the host device.

19. The storage device of claim 13, wherein the garbage collection controller is configured to:
  calculate a ratio of idle time of the host device based on a history of notifications indicative of the idle time of the host device, the notifications being receivable from the host device in the case where the storage device is connected to the host device;
  perform the determination of whether or not the total data size of writing/reading of data by commands queued in the storage device is equal to or less than the first value in order to determine whether or not the garbage collection being executed by the garbage collection processor is stopped, when the notification indicating that the host device is in the first state is received from the host device in a case where the calculated ratio exceeds a reference value; and
  perform the determination of whether or not the total data size of writing/reading of data by commands queued in the storage device is equal to or less than the first value in order to determine whether or not the garbage collection being executed by the garbage collection processor is stopped, when the notification indicating that the host device is not in the first state is received from the host device in a case where the calculated ratio is equal to or less than the reference value.

* * * * *